United States Patent [19]

Latsch et al.

[11] 4,346,625

[45] Aug. 31, 1982

[54] APPARATUS FOR CONTROLLING AN INTERNAL COMBUSTION ENGINE

[75] Inventors: Reinhard Latsch, Vaihingen; Valerio Bianchi, Hochdorf, both of Fed. Rep. of Germany

[73] Assignee: Robert Bosch GmbH, Stuttgart, Fed. Rep. of Germany

[21] Appl. No.: 212,769

[22] Filed: Dec. 4, 1980

Related U.S. Application Data

[63] Continuation of Ser. No. 114,765, Jan. 23, 1980, abandoned, which is a continuation of Ser. No. 824,190, Aug. 12, 1977, abandoned.

[30] Foreign Application Priority Data

Sep. 23, 1976 [DE] Fed. Rep. of Germany ....... 2642738

[51] Int. Cl.[3] ....................... B60K 41/06; B60K 41/10

[52] U.S. Cl. ....................................... 74/859; 74/860; 74/866

[58] Field of Search ................. 74/866, 859, 860, 857; 123/32 EA, 32 EB, 32 EC, 32 ED, 119 EC, 436, 435, 425, 419

[56] References Cited

U.S. PATENT DOCUMENTS

| | | | |
|---|---|---|---|
| 2,875,635 | 3/1959 | Fleck et al. | 74/860 |
| 3,789,816 | 2/1974 | Taplin | 123/32 EA |
| 3,799,008 | 3/1974 | Danek | 74/860 |
| 3,898,894 | 8/1975 | Aono et al. | 74/866 |
| 3,927,528 | 12/1975 | Kolk et al. | 74/859 X |
| 3,937,105 | 2/1976 | Arai | 74/866 X |
| 3,939,738 | 2/1976 | Adey et al. | 74/866 X |
| 3,943,799 | 3/1976 | Sakai et al. | 74/866 |
| 4,040,394 | 8/1977 | Wahl et al. | 123/32 EA |
| 4,044,234 | 8/1977 | Frobenius et al. | 123/32 EA |
| 4,044,235 | 8/1977 | Frobenius | 123/32 EA |
| 4,044,236 | 8/1977 | Bianchi et al. | 123/32 EA |
| 4,064,846 | 12/1977 | Latsch et al. | 123/436 |
| 4,104,990 | 8/1978 | Frobenius | 73/116 |
| 4,153,013 | 5/1979 | Bianchi et al. | 123/435 |
| 4,165,722 | 8/1979 | Aoyama | 74/860 |

*Primary Examiner*—Leslie Braun
*Attorney, Agent, or Firm*—Edwin E. Greigg

[57] ABSTRACT

The fuel-air mixture of an engine in a motor vehicle is controlled on the basis of a signal related to the fluctuations in the cyclic variations of the average combustion chamber pressure. This signal is derived indirectly from a sensor which monitors the rotational speed of engine members, e.g. the crankshaft. In order to provide closed-loop control, there is provided a reference value which is adapted continuously to changing engine speed. In addition, a correction of the reference signal is made to account for varying degrees of damping induced by changing inertial masses coupled to the engine, in particular the elements of the transmission connected between the engine and the vehicle. The correction for damping is made on the basis of signals related to the prevailing gear ratio either by direct indication of the gearshift lever position or by measuring the rotational speeds of the input and output shafts of the transmission.

2 Claims, 3 Drawing Figures

APPARATUS FOR CONTROLLING AN INTERNAL COMBUSTION ENGINE

This is a continuation of application Ser. No. 114,765 filed Jan. 23, 1980, now abandoned, which was a continuation of Ser. No. 824,190, filed Aug. 12, 1977, now abandoned.

BACKGROUND OF THE INVENTION

The invention relates generally to a method for controlling the operation of an internal combustion engine. More especially, the invention relates to a method for controlling an internal combustion engine on the basis of information related to combustion chamber pressure fluctuations. In particular, the invention relates to a method for controlling an internal combustion engine on the basis of fluctuations of cyclic variations of the combustion chamber pressure transduced from the rotational speed characteristics of the engine and possibly from other operational parameters of the engine.

The signal which relates to the roughness of engine operation, sometimes called quiet-running signal, and which is used as the basis for the known control method depends on the fluctuations of the combustion chamber pressure. When this signal is taken from the output shaft of the engine, it is subject to damping of varying intensity, for example due to the different transmission ratios selected, for example in a manual transmission. In order to obtain a uniformly useable signal for control purposes, the set-point value with which the actual fluctuations are compared would have to be adapted to the varying degrees of damping.

OBJECT AND SUMMARY OF THE INVENTION

It is thus a principal object of the invention to provide a method for controlling the operation of an internal combustion engine. A second principal object is to provide a method in which combustion chamber pressure fluctuations are used as the basis of engine control and in which the reference or set-point magnitude of these fluctuations is made variable and dependent on operational parameters related to the engine or to the vehicle which the engine powers.

According to the invention, the reference value of the engine fluctuations is adjusted to always remain close to that value of the cyclic combustion chamber fluctuations which is near the lean-running limit of the engine in the entire domain of operation.

The invention will be better understood as well as further objects and advantages thereof become more apparent from the ensuing detailed description of three preferred exemplary embodiments taken in conjunction with the drawing.

DESCRIPTION OF THE PREFERRED EMBODIMENTS

Figure 1:
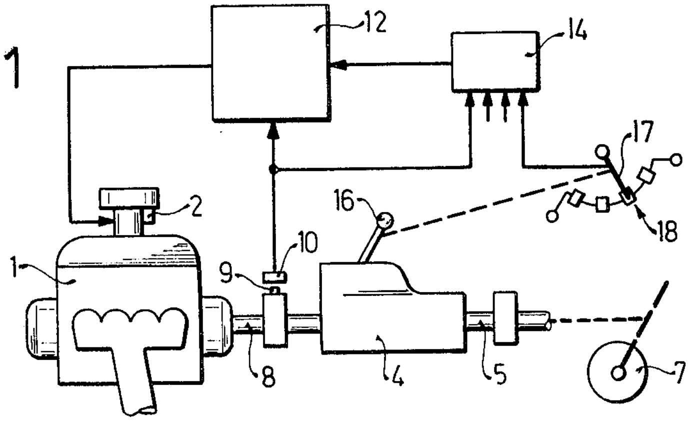
FIG. 1 is a schematic illustration of a first exemplary embodiment of the invention in which the reference value is made dependent on the transmission gear selected.

Turning now to FIG. 1, there will be seen a schematic illustration of a system for carrying out the method according to the invention relating to the control of the operation of an internal combustion engine. The system includes an internal combustion engine 1 which is provided in known and customary manner with an operational fuel-air mixture from a known fuel metering system 2. The fuel metering system 2 may be any suitable device for producing a variable fuel-air mixture in any suitable manner. The system may further include a transmission 4 coupled in known manner to the crankshaft of the engine and having a power output shaft 5 which may be connected for example to a drive shaft and a differential axle for driving vehicle wheels 7. The details of the vehicle and of the known drive mechanism have been omitted inasmuch as they relate to known apparatus. The connection between the engine and the transmission is indicated in FIG. 1 by a shaft member 8 which can be viewed as the input shaft of the transmission as well as the output portion of the engine's crankshaft. A clutch may be present but has not been shown and may be operated by the driver or may be a fluid coupling. The transmission illustrated in FIG. 1 however is intended to represent a so-called manual transmission in which gear selection is made by the driver. The transmission may be of known construction.

In the exemplary embodiment of FIG. 1, the crankshaft 8 carries a marker 9 which passes a transducer 10 for generating a signal related to the engine speed (rpm). The signal from the transducer 10 is fed to a roughness control system 12 which produces a control signal for a controller attached to the fuel metering system 2. In some cases the roughness controller 12 receives the pulses from the transducer 10 in rpm-synchronous manner whereas in other cases the signal may be continuous. In both cases however, the fluctuations of the cyclic variations in the mean combustion chamber pressure are recognized from the variations of the crankshaft rotation and are used by the controller 12 to produce a fuel/air mixture control signal.

It is an experimental fact that the signal related to the fluctuations of cyclic variations in the mean combustion chamber pressure, also called the roughness, varies within different amplitude limits, depending on the engine speed, if the operation is intended to be held near the so-called lean-running limit of the engine. In order to account for this rpm-dependent variation, it is known to vary the reference value of the fluctuations as a function of rpm. In particular, it is known to vary the reference signal as a function of the third power of the average crankshaft period of rotation. (Proportional to $T^3$). In addition, the reference value may be made dependent on further operational parameters. These methods are all represented in the drawing by showing the circuit 14 which receives various input signals related to engine speed, etc., for example the absolute induction tube pressure or the engine temperature and which generates a suitable reference value for the controller 12.

It has been found, however, that the roughness control signal derived from the crankshaft speed also depends on the magnitude of inertial masses which are coupled to the engine and which have a damping effect on the rotation of the engine's crankshaft. A particularly important damping factor is produced by the transmission normally coupled between the engine and a vehicle powered by that engine. Furthermore, depending on the vehicle and the type of transmission, the signal is subjected to a dependence on the particular gear selected by the transmission. If this dependence on the selected gear of the transmission is not considered, then, in low gears, the leaning out of the mixture on the basis of roughness control will be relatively small and only in the highest gear will the operational mixture of the engine be correctly leaned out.

In order to take account of the damping effects of the various transmission gears on the magnitude or amplitude variation of the control signal, the invention provides changing the reference signal in the following manner. As illustrated in FIG. 1, the gear selector lever 16 is connected to a switch which, depending on the position of the lever 17, taps a voltage divider 18 and provides a particular voltage level related to the selected gear and feeds it to the circuit 14 for a suitable change of the reference value.

The control signal generated by the roughness controller 12 is then fed to the final control element within the fuel metering system which changes the mixture in known manner so as to maintain the desired conditions. This may be done, for example, by changing the air flow rate, the fuel rate and possibly also by changing the exhaust gas recycle rate.

Figure 2:
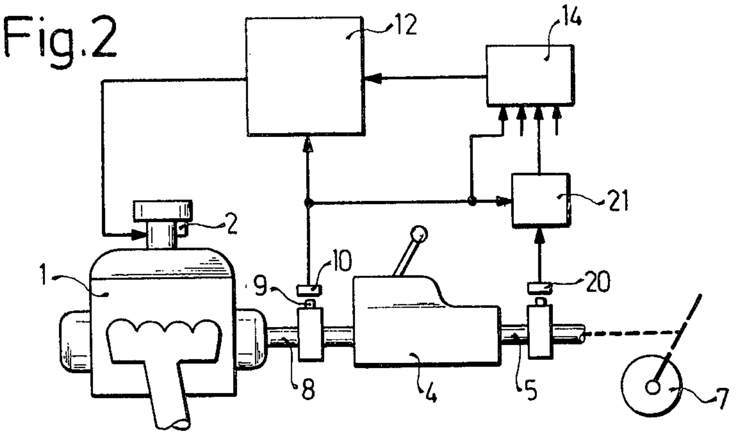
FIG. 2 is a schematic diagram of a second embodiment of the invention in which the control signals are derived at the power take-off of the engine and from the subsequent transmission.

In a second exemplary embodiment of the invention, illustrated in FIG. 2, several parts retain the same structure and identity as they had in FIG. 1 and are referred to by the same numerals. In this case, however, the transmission 4 may be an automatic transmission as well as a manual transmission. Furthermore, the correcting, transmission-dependent parameter is obtained in a different manner. The output shaft 5 of the transmission is associated with a second sensor or transducer 20 which generates a signal related to the rpm of the output shaft 5 and feeds it to a dividing circuit 21. The dividing circuit also obtains the rpm signal from the transducer 10 and divides it by the signal from the transducer 20. The result is fed as a gear-dependent parameter to the circuit 14 for generating a reference value. The circuit 14 also receives the rpm signal from the transducer 10 and may further receive other parameters for producing a final reference value.

In a variant of the second embodiment, the signal from the transducer 20 may be replaced by a signal from a speedometer shaft, especially an electronic speedometer transducer.

Figure 3:
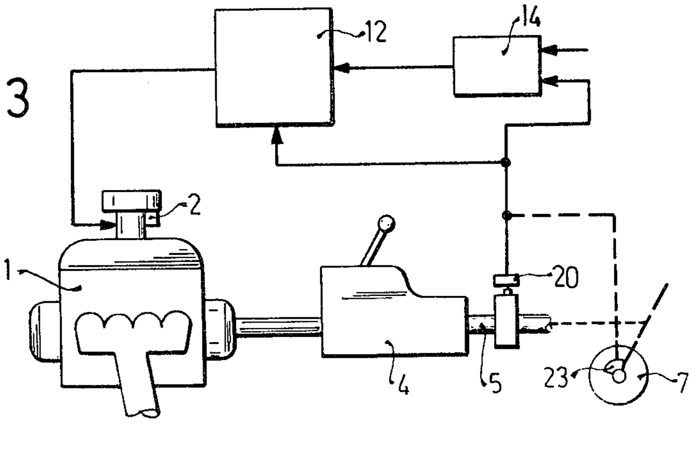
FIG. 3 is an illustration of a third embodiment of the invention.

FIG. 3 illustrates a system for practicing a third embodiment of the invention for making the roughness signal dependent on the transmission ratio. In this method there is provided, as before, an internal combustion engine 1 and a subsequent transmission 4 which may be manual or automatic. The power output shaft 5 of the transmission is coupled to the vehicle wheels 7. The system also includes again a roughness controller 12 which produces a control signal for changing the fuel mixture of the engine.

In this third exemplary embodiment, however, the controlled variable sensed by the roughness controller 12 for comparison with the reference value is also generated by the transducer 20 associated with the output shaft 5 of the transmission. The signal may be cyclic as well as continuous, depending on the type of controller used. The signal from the transducer 20 is also fed to the circuit 14 for forming a reference value and this circuit may receive other signals related to the operation of the engine. In place of the transducer 20, there may also be used a transducer 23 which is associated directly with the drive wheels of the vehicle and serves at the same time to control a wheel lock-up prevention system (anti-skid system) for the brakes of the vehicle which may be of known construction.

In this third exemplary embodiment, the controlled variable which depends on the fluctuations of cyclic variations of the average combustion chamber pressure is derived from the output side of the transmission and thus automatically includes the dependence on the gear ratio in the formation of the proper control signal for the fuel metering system. Accordingly, the reference value needs to take into account only the rpm dependence of this variable.

In this third embodiment, it is advantageous if the controller is switched off or held at a constant value during a gear selection so as to prevent an undue influence on the control process. If a transducer 23 is used in association with the wheels of the vehicle, the controller may advantageously be shut off also when the vehicle wheels are being braked.

The foregoing relates to merely preferred exemplary embodiments of the invention, it being understood that other embodiments and variants thereof are possible within the spirit and scope of the invention.

What is claimed and desired to be secured by Letters Patent of the United States is:

1. An apparatus for controlling the operation of an internal combustion engine installed in a vehicle to provide motive power thereto comprising:
- fuel-air mixture preparation means for an internal combustion engine having a combustion chamber;
- a transmission means to provide transmission of rotary power at variable speed ratios from said engine to said vehicle;
- an indicator means connected to the transmission for generating a signal indicating a speed ratio of the transmission;
- a crankshaft rotatable by said transmission means;
- a marker on said rotatable crankshaft;
- transducer means for detecting said marker as said crankshaft rotates and generating a signal indicating engine speed and fluctuations in the cyclic variations of the combustion chamber pressure;
- a reference means connected to receive the indicator means signal and the transducer signal and which generates a reference signal;
- a control means connected to receive the transducer signal and the reference signal for changing the fuel-air mixture after comparing the fluctuations in the cyclic variations of the combustion chamber pressure with the reference signal; and wherein
- the indicator means signal is fed to the reference means to adjust the reference signal in response to a change in speed ratio of the transmission.

2. An apparatus for controlling the operation of an internal combustion engine as defined in claim 1, in which:
- said indicator means includes a gear selector means for said transmission means; and
- a variable voltage level switch means operative by said gear selector means.

* * * * *